United States Patent [19]

Yoshida et al.

[11] Patent Number: 4,547,072
[45] Date of Patent: Oct. 15, 1985

[54] OPTICAL FIBER GYRO

[75] Inventors: Kenichi Yoshida; Takashi Yokohara; Kimizo Ono; Yoshikazu Nishiwaki; Koichi Tsuno, all of Osaka, Japan

[73] Assignee: Sumitomo Electric Industries, Ltd., Osaka, Japan

[21] Appl. No.: 502,063

[22] Filed: Jun. 7, 1983

[30] Foreign Application Priority Data

Jun. 9, 1982 [JP] Japan .................. 57-98995

[51] Int. Cl.⁴ .................. G01B 9/02; G01C 19/64
[52] U.S. Cl. .................. 356/350
[58] Field of Search .................. 356/350

[56] References Cited

PUBLICATIONS

Hotate et al, "Fiber-Optic Laser Gyro with Easily Introduced Phase-Difference Bias," Applied Optics, vol. 20#24, Dec. 15, 1981, pp. 4313-4318.

Primary Examiner—Vincent P. McGraw
Attorney, Agent, or Firm—Sughrue, Mion, Zinn, Macpeak, and Seas

[57] ABSTRACT

An optical fiber gyro system provides a pair of separated optical paths containing partial common portions. A phase difference $\Delta\theta$ is detected using a plurality of detectors which yield sin and cos functions in $\Delta\theta$. Functions are formed as linear couplings of these functions, and the phase difference $\Delta\theta$ is obtained using the function of best sensitivity for the given range of $\Delta\theta$.

7 Claims, 4 Drawing Figures

OPTICAL FIBER GYRO

BACKGROUND OF THE INVENTION

This invention relates to an optical fiber gyro in which any phase difference $\Delta\theta$ can be detected with high sensitivity.

In an optical fiber gyro, a laser beam is passed both clockwise and counterclockwise through an optical fiber loop which is fabricated by winding an optical fiber a number of turns, so that the two light beams are subjected to interference and the phase difference $\Delta\theta$ due to the Sagnac effect is detected. The phase difference $\Delta\theta$ is proportional to the angular velocity $\Omega$ of the optical fiber gyro:

$$\Delta\theta = \frac{8\pi NA}{C\lambda} \Omega \tag{1}$$

The angular velocity $\Omega$ can be calculated by detected $\Delta\theta$. In the above-described equation, N is the number of turns of the optical fiber loop, A is the sectional area of the loop, C is the optical velocity in a vacuum, and $\lambda$ is the wavelength of a light source.

An optical fiber gyro utilizing the Sagnac effect is considerably effective as a means for determining the angular velocity of a rotating object.

A variety of optical fiber gyroscopes with different modulation method employed have been proposed in the art.

A fundamental system in which no modulation is employed and both light beams are allowed to propagate in one and the same optical path is advantageous in that no remaining optical path difference is caused. However, in the case of the non-modulated system, the output signal of the optical detector includes a phase difference $\Delta\theta$ in the following form:

$$I(t) \propto (1 + \cos(\Delta\theta)) \tag{2}$$

Since it is a cosine function, when $\Delta\theta$ is close to zero (0) the variation is small and the sensitivity is low.

In order to overcome this drawback, a method has been employed in which the optical path is divided into two optical paths, and a $\pi/2$ phase shifter is inserted in one of the two optical paths.

FIG. 4 is an explanatory diagram showing the arrangement of a conventional optical fiber gyro.

In FIG. 4, reference numeral 31 designates a laser; and 32, 33, 34 and 35, half-mirrors which are disposed at the four corners of a square in a manner such that their surfaces are in parallel with the diagonal lines of the square.

Further in FIG. 4, reference numerals 36 and 37 designate condenser lenses which are adapted to concentrate the laser beam and to apply the laser beam thus concentrated to the two ends of an optical fiber loop 38.

The optical fiber loop is a single mode fiber or a polarization maintaining fiber.

The coherent beam from the laser 31 is divided into two light beams by the half-mirror 32. One of the two light beams, namely, a clockwise light beam passes through the half-mirror 33 and reaches the end face of the fiber through the lens 36, thus passing through the optical fiber loop 38 clockwise. The light beam is then applied to an optical detector 39 after being reflected by the half-mirrors 35 and 34.

The other light beam, namely, a counterclosewise light beam is reflected by the half-mirror 32 and is applied to the optical fiber through the half-mirror 35 and the lens 37. This light beam passes through the optical fiber loop while turning counterclockwise as many times as the number of turns of the loop, and is applied to the optical detector via the half-mirror 33 and the half-mirror 34.

If the half-mirrors 32 through 35 are disposed exactly at the four corners of the square and the two light beams go along the sides of the square, the optical path of the clockwise beam is equal to that of the counterclockwise beam. The phase difference $\Delta\theta$ to the rotation of the optical fiber loop at an angular velocity $\Omega$ is divided into two parts, and the wavefunction $f_1(t)$ of the clockwise beam at the optical detector and the wavefunction $f_2(t)$ of the counterclockwise beam are represented by the following expressions (3) and (4), respectively:

$$f_1(t) = E_0 e^{i(\omega t + \Delta\theta/2)} \tag{3}$$

$$f_2(t) = E_0 e^{i(\omega t - \Delta\theta/2)} \tag{4}$$

where $E_0$ is the amplitude. The same amplitude $E_0$ is found in the expression of the two beams, because the amplitudes of the two beams are equal in the ideal case.

The optical detector outputs the square of the sum of the input. That is, the output $I_1(t)$ is:

$$I_1(t) = 2 E_0^2 (1 + \cos \Delta\theta) \tag{5}$$

This corresponds to expression (2). In order to eliminate the cosine function, the following method is employed:

As shown in FIG. 4, a phase shifter 40 for shifting the phase by $\pi/2$ is inserted in one of the optical paths.

Therefore, instead of the wavefunction of expression (4), the wavefunction $f_3(t)$ of the following expression (6) is given to the counterclockwise light beam:

$$f_3(t) = E_0 e^{i(\omega t + \pi/2 - \Delta\theta/2)} \tag{6}$$

The optical detector detects the square of the sum of $f_1$ and $f_3$, and therefore the output $I_2$ is:

$$I_2(t) = 2 E_0^2 (1 + \sin \Delta\theta) \tag{7}$$

The output $I_2(t)$ is high in sensitivity when $\Delta\theta$ is close to zero (0), and it is low in sensitivity when $\Delta\theta$ is close to $\pm\pi/2$.

As is apparent from the above description, expressions (5) and (7) are advantageous in one aspect, but disadvantageous in another aspect. However, it may be said that they are complementary to each other. Expressions (5) and (7) should thus be selectively employed according to the data $\Delta\theta$.

However, in practice, it is considerably difficult to insert the phase shifter 40 in the light path, and to remove it therefrom. More specifically, if the phase shifter is moved, it is considerably difficult to set the phase shifter at its original position and in the original direction. This may result in an error.

SUMMARY OF THE INVENTION

This invention provides an optical fiber gyro in which two separated optical paths are provided, in which the phase difference $\Delta\theta$ due to the Sagnac effect is detected in the form of $\cos(\Delta\theta)$ or $\sin(\Delta\theta)$, so that the phase difference $\Delta\theta$ may be obtained by the use of the function best in sensitivity.

DETAILED DESCRIPTION OF THE PREFERRED EMBODIMENTS

Figure 1:
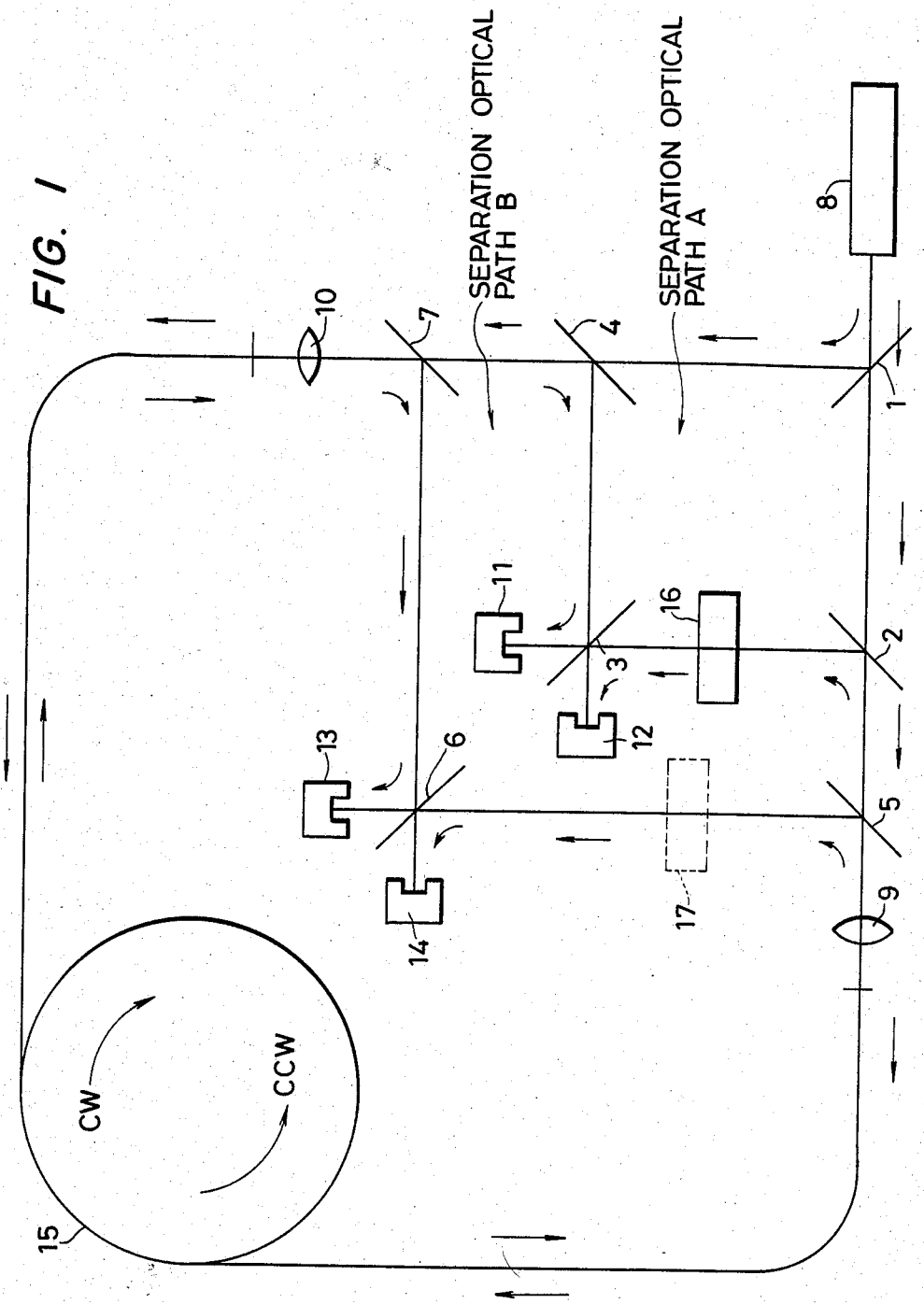
FIG. 1 is an explanatory diagram showing the arrangement of an optical fiber gyro according to this invention.

FIG. 1 is an explanatory diagram showing the optical system of an optical fiber gyro according to this invention.

Half-mirror 1, 2, 3 and 4 are disposed at the four corners of a square in a manner such that their surfaces are on the diagonal lines of the square. The optical path in the form of a square formed by connecting the centers of the half-mirrors 1, 2, 3 and 4 will be referred to as the separation optical path A.

Similarly, half-mirrors 5, 6, 7 and 1 are disposed at the four corners of a square in a manner such that their surfaces are on the diagonal lines of this square. The optical path in the form of a square formed by connecting the centers of the half-mirrors 5, 6, 7 and 1 will be referred to as the separation optical path B.

The separation optical paths A and B both include the half-mirror 1. The half-mirrors 1, 2 and 5 are on one and the same straight line, as are the half-mirrors 1, 4 and 7. These straight lines will be referred to as common separation lines 1-2-5 and 1-4-7, respectively.

On the other hand, segments connecting the half-mirrors 3 and 4 and the half-mirrors 3 and 2 will be referred to as isolated separation paths 3-4 and 3-2, respectively.

Thus, in each of the separation optical paths A and B, half of the path is made of a common separation path, and the remaining half is made up of an isolated separation path.

Further in FIG. 1, a semiconductor laser 8 operates to oscillate a coherent light beam. The laser 8 is disposed on the extension of either the common separation path 1-2-5 or 1-4-7 behind the common half-mirror 1.

Optical detectors 11 and 12 are disposed on the extension of the isolated separation paths 2-3 and 4-3, respectively.

Optical detectors 13 and 14 are disposed on the extension of the isolated separation paths 5-6 and 6-7, respectively.

An optical fiber loop 15 is obtained by winding a single mode optical fiber several turns.

Lenses 9 and 10 are arranged on the extensions of the common separation paths 1-2-5 and 1-4-7, so that the light beams are concentrated at the end faces of the optical fibers, respectively.

A $\pi/2$ phase shifter 16 is inserted in one of the isolated separation paths of the separation optical path A. In the case of FIG. 1, the phase shifter 16 is inserted in the isolated separation path 2-3.

The optical detectors 11, 12, 13 and 14 provide outputs D1, D2, D3 and D4, respecitvely.

Since the $\pi/2$ phase shifter is inserted in the separation optical path A, the output D1 is given similarly as in the case of expression (7), thus including sin $\Delta\theta$.

In other words, $$D_1 = 2 E_0^2 (1 + \sin \Delta\theta) \tag{8}$$

The output D2 is not the same as expression (8). Light advances from a medium lower in refractive index towards a medium higher, where, when it is reflected, the electric field phase is shifted by $\pi$. As the mirror is higher in refractive index than air, the phase of the reflected light is shifted by $\pi$. The phase of the passed light is not shifted at all.

Expression (3) with $\pi$ added is added to expression (6) with $\pi$ added, and the result of addition is squared to obtain the output D2.

$$D2 = 2 E_0^2 (1 - \sin \Delta\theta) \tag{9}$$

The sign of sin $\Delta\theta$ is different.

From expressions (8) and (9), sin $\Delta\theta$ can be obtained.

$$\sin \Delta\theta = (D1 - D2)/(D1 + D2) \tag{10}$$

The above description is applicable to the ideal case only. In practice, frequently, the clockwise light beam intensity $E_1$ is not equal to the counterclockwise beam intensity $E_2$.

However, even in such a case, an expression approaching expression (10) can be provided.

The outputs D3 and D4 of the optical detectors in the separation optical path B will now be described. The optical path B includes no phase shifter. Therefore, its output corresponds to expression (5). The output D3 is as follows:

$$D3 = 2E_0(1 + \cos \Delta\theta) \tag{11}$$

The output D4 is as follows:

$$D4 = 2E_0(1 - \cos \Delta\theta) \tag{12}$$

Thus, cos $\Delta\theta$ can be obtained:

$$\cos \Delta\theta = \frac{D3 - D4}{D3 + D4} \tag{13}$$

Expressions (10) and (13) are applicable to the ideal case only. More specifically, these expressions can be established only under the conditions that the clockwise beam is equal in intensity to the counterclockwise beam, and each of the half-mirrors 1 through 7 transmits exactly 50% of the light and reflects 50%.

Even if these conditions are not fully satisfied, expressions replacing expressions (10) and (13) may easily be formed, and it is always possible to calculate D1 through D4 from sin $\Delta\theta$ and cos $\Delta\theta$.

In the range of $-\pi/2 < \Delta\theta < \pi/2$ the following n eigenfunctions are defined in sin $\Delta\theta$ and cos $\Delta\theta$:

$$S_i = a_{i1} \sin \Delta\theta + a_{i2} \cos \Delta\theta \tag{14}$$

(where $i = 1, 2, \ldots n$)
the domain ($-\pi/2$ to $\pi/2$) of $\Delta\theta$ is divided into n parts. The domain T is divided into n domains $T_1, \ldots T_n$.

$$T = T_1 + T_2 + \ldots + T_n \tag{15}$$

The absolute value of the differentiation $dS_i/d(\Delta\theta)$ is made larger than the differentiations of other functions in the prime domain $T_i$.

When $\Delta\theta$ is in the prime domain $T_i$, $\Delta\theta$ is determined from the value of the function $S_i$.

Of course, the prime domain $T_i$ to which $\Delta\theta$ belongs should be known in advance.

Eigenfunctions $S_i$ defined by expression (14) are all continuous single-valued functions in the domain T ($-\pi/2$ to $\pi/2$).

Therefore, if expression (14) is reversely calculated by using an optional eigenfunction $S_i$, an approximate value of $\Delta\theta$ can be obtained. As a result, a prime domain $T_i$ to which $\Delta\theta$ belongs can be determined. Let us call such a function an "inclusion function" for convenience in description.

For instance, sin ($\Delta\theta$) can be employed as the inclusion function. When $T_i$ is determined, $\Delta\theta$ is accurately determined from the value of the corresponding eigenfunction $S_i$, because when $\Delta\theta$ is included in $T_i$, the eigenfunction $S_i$ is higher in sensitivity than other functions.

This will be described with reference to a specific example. In this case, n=3.

It is assumed that the eigenfunctions are as follows:

$$S_1 = \frac{1}{\sqrt{2}} (\sin \Delta\theta - \cos \Delta\theta) \tag{15}$$

$$S_2 = \sin \Delta\theta \tag{16}$$

$$S_3 = \frac{1}{\sqrt{2}} (\sin \Delta\theta + \cos \Delta\theta) \tag{17}$$

Figure 2:
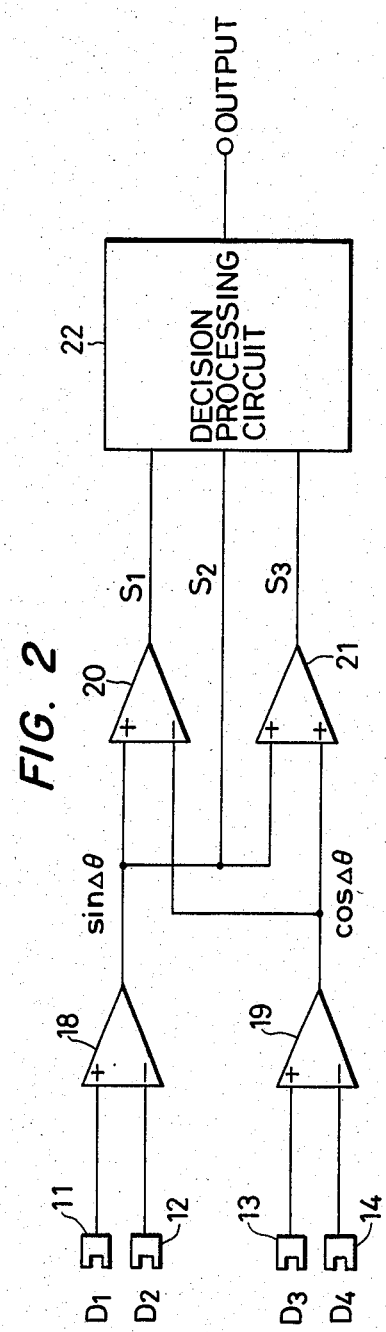
FIG. 2 is a block diagram showing a phase difference calculating circuit of the invention.
Figure 4:
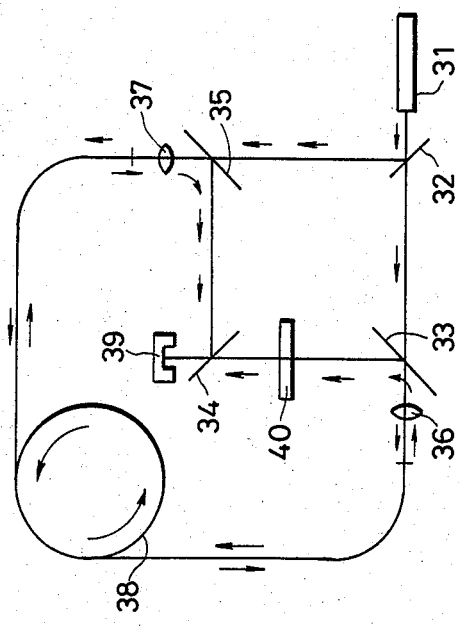
FIG. 4 is an explanatory diagram showing the arrangement of a conventional optical fiber gyro.

FIG. 2 is a block diagram of a phase difference calculating circuit of the invention for the above-described case.

In FIG. 2, reference characters D1 through D4 designate the outputs of the optical detectors.

Substractors 18 and 19 calculate sin $\Delta\theta$ and cos $\Delta\theta$ from D1 through D4, thus performing calculations as indicated by expressions (10) and (13).

A substractor 20 performs subtraction as indicated by expression (15), to obtain $S_1$.

An adder 21 performs addition as indicated by expression (17), to obtain $S_3$.

Figure 3:
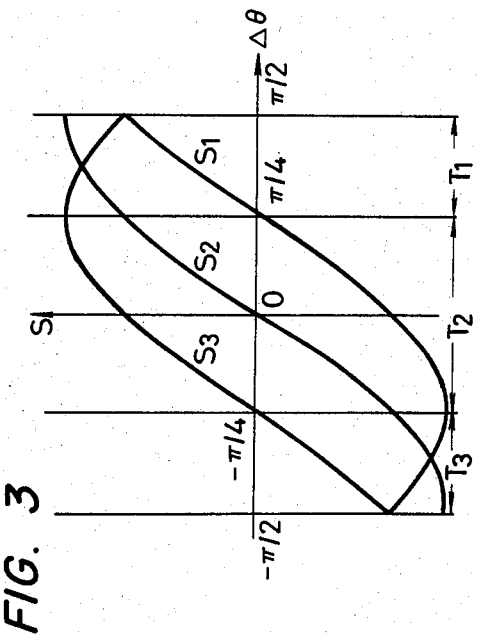
FIG. 3 is a graphical representation indicating eigenfunctions $S_1$ through $S_3$ and prime domains $T_1$ through $T_3$.

FIG. 3 indicates the eigenfunctions $S_1$, $S_2$ and $S_3$ plotted against the data $\Delta\theta$.

A decision processing circuit 22 carries out the following process:

The prime domains $T_1$, $T_2$ and $T_3$ are as follows:

$$T_1 = \left[\frac{\pi}{4}, \frac{\pi}{2}\right] \tag{18}$$

$$T_2 = \left[-\frac{\pi}{4}, \frac{\pi}{4}\right] \tag{19}$$

$$T_3 = \left[-\frac{\pi}{2}, -\frac{\pi}{4}\right] \tag{20}$$

It is assumed that the inclusion function $P(\Delta\theta)$ is sin $\Delta\theta$.

(1)

$$\text{When } \frac{\sqrt{2}}{2} \leq P, \tag{1}$$

$\Delta\theta$ is in $T_1$. $\Delta\theta$ is determined from the eigenfunction $S_1$.

(2) When $$\text{When } -\frac{\sqrt{2}}{2} \leq P < \frac{\sqrt{2}}{2}, \tag{2}$$

$\Delta\theta$ is in $T_2$. $\Delta\theta$ is determined from the eigenfunction $S_2$.

(3) When $$\text{When } P < -\frac{\sqrt{2}}{2}, \tag{3}$$

$\Delta\theta$ is in $T_3$. $\Delta\theta$ is determined from the eigenfunction $S_3$.

In the above-described example, it cannot be said that in the prime domain $T_i$, the absolute value of the differentiation $dS_i/d(\Delta\theta)$ of the corresponding eigenfunction is larger than the differentiations of the other functions. It is thus not always necessary that $S_i$ is highest in sensitivity in the prime domain $T_i$ as described above.

In the case of n=3, the prime domain $T_1$, $T_2$ and $T_3$ and the eigenfunctions $S_1$, $S_2$ and $S_3$ may be as follows:

$$T_1 = \left[\frac{\pi}{6}, \frac{\pi}{2}\right] \tag{21}$$

$$T_2 = \left[-\frac{\pi}{6}, \frac{\pi}{6}\right] \tag{22}$$

$$T_3 = \left[-\frac{\pi}{2}, -\frac{\pi}{6}\right] \tag{23}$$

$$S_1 = \frac{1}{2} \sin \Delta\theta - \frac{\sqrt{3}}{2} \cos \Delta\theta \tag{24}$$

$$S_2 = \sin \Delta\theta \tag{25}$$

$$S_3 = \frac{1}{2} \sin \Delta\theta + \frac{\sqrt{3}}{2} \Delta\theta \tag{26}$$

In this case, in the prime domain $T_i$, the eigenfunction $S_i$ can always determine $\Delta\theta$ with the highest accuracy.

It is not always necessary that the n prime domain are equal in width.

It is assumed that the eigenfunction is as follows:

$$S_i = \sin(\Delta\theta - \eta i) \tag{27}$$

where $\eta i$ is the center of the prime domain. In this case, the differentiation $dS_i/d(\Delta\theta)$ in the prime domain $T_i$ is always larger than the differentiations of the other eigenfunctions.

In the example shown in FIG. 1, no phase shifter is inserted in the separation optical path B.

However, because of the separation optical path, sometimes an optical path difference remains between the clockwise beam and the counterclockwise beam. In this case, it is sometimes necessary to eliminate the remaining optical path difference by inserting a phase shifter 17 (as indicated by the broken line).

In the above-described embodiment, the separation optical paths A and B are provided to obtain sin $\Delta\theta$ and cos $\Delta\theta$, which are subjected to linear coupling to obtain n eigenfunctions.

However, strictly speaking, it is not always required to detect sin $\Delta\theta$ and cos $\Delta\theta$ only.

That is, with the separation optical paths A and B, the following are detected:

$$A \rightarrow \sin(\Delta\theta + \epsilon) \quad (28)$$

$$B \rightarrow \sin(\Delta\theta + \delta) \quad (29)$$

The data $|\delta - \epsilon|$ should be close to $\pi/2$.

n eigenfunctions can readily be determined from the two functions (28) and (29).

The offset components $\epsilon$ and $\delta$ can readily be obtained with $\Omega = 0$ as a reference.

Thus, according to the invention, any phase difference $\Delta\theta$ between the clockwise light beam (CW) and the counterclockwise light beam (CCW) in the optical fiber gyro can be determined with high accuracy.

What is claimed is:

1. An optical fiber gyro system, comprising:
   an optical fiber loop comprising a single mode optical fiber wound a number of turns;
   a laser;
   a half-mirror for dividing a laser beam into a clockwise beam and a counterclockwise beam which are respectively applied to either end of said optical fiber loop;
   a first separation optical path including said half-mirror and further half-mirrors;
   a second separation optical path including said half-mirror and still further half-mirrors;
   two pairs of optical detectors disposed in said first and second separation optical paths, respectively;
   a phase shifter inserted in at least one of said separation optical paths; and
   a phase difference calculating circuit for calculating a phase difference $\Delta\theta$, in which
   two functions in $\Delta\theta$ are obtained, the domain T of said phase difference $\Delta\theta$ is divided into prime domains $T_1, T_2, \ldots$ and $T_n$, eigenfunctions $S_1, S_2, \ldots$ and $S_n$ are calculated as linear couplings of said two functions, and when $\Delta\theta$ is in a prime domain $T_i$, said phase difference $\Delta\theta$ is determined from an eigenfunction $S_i$.

2. A system as claimed in claim 1, wherein two functions of a phase difference obtained by said optical detectors in said separation optical paths are as follows:
   sin $\Delta\theta$, and
   cos $\Delta\theta$.

3. A system as claimed in claim 1, in which said eigenfunction $S_i$ is as follows:

$$S_i = \sin(\Delta\theta - \eta i)$$

where $\eta i$ is the central value of said prime domain $T_1$.

4. A system as claimed in claim 1, in which said prime domain $T_1$, $T_2$ and $T_3$ and said eigenfunctions $S_1$, $S_2$ and $S_3$ are as follows:

$$T_1 = \left[\frac{\pi}{4}, \frac{\pi}{2}\right]$$

$$T_2 = \left[-\frac{\pi}{4}, \frac{\pi}{4}\right]$$

$$T_3 = \left[-\frac{\pi}{2}, -\frac{\pi}{4}\right]$$

$$S_1 = \frac{1}{\sqrt{2}}(\sin \Delta\theta - \cos \Delta\theta)$$

$$S_2 = \sin \Delta\theta$$

$$S_3 = \frac{1}{\sqrt{2}}(\sin \Delta\theta + \cos \Delta\theta)$$

5. A system as claimed in claim 1, said phase difference calculating circuit comprising a subtractor means respectively receiving inputs from said first and second pairs of optical detectors, for outputting sin $\Delta\theta$ and cos $\Delta\theta$ functions, respectively.

6. A system as claimed in claim 5, said sin $\Delta\theta$ and cos $\Delta\theta$ function outputs respectively being applied as inputs to further subtractor means and to adder means, for forming ones of said eigenfunctions.

7. A system as claimed in claim 6, further including decision circuit means for determining the domain of $\Delta\theta$, and for determining $\Delta\theta$ from an eigenfunction corresponding to the determined domain.

* * * * *